(12) United States Patent
Horio et al.

(10) Patent No.: US 10,801,884 B2
(45) Date of Patent: Oct. 13, 2020

(54) BLADE DRIVING DEVICE AND INFRARED IMAGING DEVICE

(71) Applicant: NIDEC COPAL CORPORATION, Tokyo (JP)

(72) Inventors: Naofumi Horio, Tokyo (JP); Hiroshi Miyazaki, Tokyo (JP); Shigemi Takahashi, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 54 days.

(21) Appl. No.: 16/321,347

(22) PCT Filed: May 25, 2017

(86) PCT No.: PCT/JP2017/019525
§ 371 (c)(1),
(2) Date: Jan. 28, 2019

(87) PCT Pub. No.: WO2018/020810
PCT Pub. Date: Feb. 1, 2018

(65) Prior Publication Data
US 2019/0178708 A1 Jun. 13, 2019

(30) Foreign Application Priority Data
Jul. 26, 2016 (JP) .................. 2016-146000

(51) Int. Cl.
*G01J 1/04* (2006.01)
*G03B 9/20* (2006.01)
(Continued)

(52) U.S. Cl.
CPC ............. *G01J 1/044* (2013.01); *G01J 5/0285* (2013.01); *G03B 9/10* (2013.01); *G03B 9/20* (2013.01);
(Continued)

(58) Field of Classification Search
CPC ... G03B 9/04; G03B 1/00; G03B 7/00; G03B 9/08; G03B 9/10; G03B 9/64; G03B 9/36;
(Continued)

(56) References Cited

U.S. PATENT DOCUMENTS

2008/0175583 A1*  7/2008  Seita .................. G03B 19/12
                                                       396/357
2011/0176194 A1   7/2011  Chou

FOREIGN PATENT DOCUMENTS

JP       6-102088 A     4/1994
JP    2003-131286 A     5/2003
(Continued)

*Primary Examiner* — Don K Wong
(74) *Attorney, Agent, or Firm* — Troutman Pepper Hamilton Sanders LLP

(57) ABSTRACT

The use of a blade driving device including a first plate wherein a first opening portion is formed; a blade formed so as to enable opening/closing of the first opening portion; a driving mechanism driving the blade; and a cover, wherein a second opening portion is formed so as to essentially overlap the first opening portion, and formed so as to cover the base plate and the driving mechanism portion. Because the base plate and driving mechanism portion are covered by the cover, when compared to the conventional structure, this enables the transmission, without variability, of heat in relation to the driving mechanism portion and the base plate.

6 Claims, 4 Drawing Sheets

(51) Int. Cl.
   *G03B 9/10*     (2006.01)
   *G01J 5/02*     (2006.01)
   *H04N 5/33*     (2006.01)
   *G03B 9/36*     (2006.01)
   *G01J 5/00*     (2006.01)

(52) U.S. Cl.
   CPC ............... *G03B 9/36* (2013.01); *H04N 5/33* (2013.01); *G01J 2005/0048* (2013.01)

(58) Field of Classification Search
   CPC ........ G03B 21/2053; G03B 9/06; G03B 3/02; H04N 5/2254; H04N 5/2257; G02B 7/00; B02B 26/023
   See application file for complete search history.

(56) References Cited

FOREIGN PATENT DOCUMENTS

| | | |
|---|---|---|
| JP | 2006-11293 A | 1/2006 |
| JP | 2010-154627 A | 7/2010 |
| JP | 2013-97103 A | 5/2013 |
| JP | 2013-118547 A | 6/2013 |
| JP | 2015-79113 A | 4/2015 |
| JP | 2016-521872 A | 7/2016 |
| WO | 2005/036251 A1 | 4/2005 |

* cited by examiner

BLADE DRIVING DEVICE AND INFRARED IMAGING DEVICE

CROSS REFERENCE TO RELATED APPLICATIONS

This Application is a National Stage Application of International Application PCT/JP2017/019525 filed May 25, 2017, which published as WO 2018/020810 on Feb. 2, 2018. The International Application claims priority to Japanese Patent Application No. 2016-146000 filed Jul. 26, 2016. All of the applications are herein incorporated by reference in their entirety.

FIELD OF TECHNOLOGY

One aspect of the present invention relates to a blade driving device for opening/closing an opening portion.

BACKGROUND

A far infrared radiation camera captures, as an image, a heat distribution, or the like, of an imaging subject, through a sensor for detecting far infrared radiation emitted from the imaging subject. Moreover, a far infrared radiation camera uses a structure wherein a calibration shutter is installed in order to capture the image clearly. In such a far infrared radiation camera, the sensor will also detect the infrared radiation that is produced from the structural components of the camera, such as the controlling portion, and thus when heat is transferred non-uniformly to the shutter curtain (blade), this prevents the calibration and imaging from being performed accurately. In order to cancel the infrared radiation that is emitted from other than the imaging subject in this way, in the conventional far infrared radiation camera, shading correction, and the like, is performed. Moreover, Japanese Unexamined Patent Application Publication 2013-118547 discloses also a structure provided with a control device for correcting the captured image.

SUMMARY

However, in the conventional infrared radiation camera, or blade driving device that is installed in an infrared radiation camera, as described above, in some cases it has not been possible to correct or cancel adequately the effects of infrared radiation that is emitted from the structural components, such as the blade.

The present invention adopts means such as the following in order to solve the problem described above. Note that while in the explanation below, reference symbols from the drawings are written in parentheses for ease in understanding the present invention, the individual structural elements of the present invention are not limited to those that are written, but rather should be interpreted broadly, in a range that could be understood technically by a person skilled in the art.

One means according to the present invention is blade driving device having a base plate wherein a first opening portion is formed; a blade that is formed so as to enable movement so as to open/close the first opening portion; a driving mechanism portion for driving the blade; and a cover wherein a second opening portion is formed so as to essentially overlap the first opening portion, and formed so as to cover the base plate and the driving mechanism portion.

In the blade driving device structured as described above, the base plate and driving mechanism portion are covered by the cover, and thus, when compared to the conventional structure, this enables the transmission, without variability, of heat in relation to the driving mechanism portion and the base plate. Through this, it is possible to suppress variability even regarding heat that is transmitted to the blade. As a result, this enables suppression of the effects from the driving mechanism portion in the base plate when it comes to heat and infrared radiation that is transmitted to the sensor that is disposed in front of the blade driving device, described above.

In the blade driving device set forth above, preferably the cover has thermal conductivity that is higher than that of the base plate.

The blade driving device of this structure enables the heat that is radiated from the driving mechanism portion and the base plate to be transmitted as uniformly as possible to the entirety of the cover. This enables suppression of variability in the heat that is transmitted to the blade from the driving mechanism portion, the base plate, and the cover. Consequently, this enables further suppression of the effects from the driving mechanism portion, the base plate, and the cover in regards to the heat and infrared radiation that is transmitted to the sensor.

In the blade driving device set forth above, preferably the cover has thermal emissivity that is less than that of the base plate.

The blade driving device of this structure enables the heat of the cover to be made as uniform as possible, through the transmitted heat being transmitted evenly within the range of the cover, without transmission to other members. This enables further suppression of variability in the heat that is transmitted to the blade. Consequently, this enables further suppression of the effects from the driving mechanism portion, the base plate, and the cover in regards to the heat and infrared radiation that is transmitted to the sensor.

In the blade driving device described above
the structure may be such that the driving mechanism portion includes at least a rotor and a coil.

Furthermore, in the blade driving device described above, preferably
the structure may be such that the driving mechanism portion includes at least an electromagnetic and a charging motor.

Moreover, the present invention includes an infrared radiation imaging device that further includes
any of the blade driving device as set forth above, and an infrared radiation imaging portion disposed so as to detect light that passes through the first opening portion and the second opening portion.

The infrared radiation imaging device described above, enables a structure that suppresses the effects of heat and infrared radiation from these structural members in an infrared radiation imaging device that is easily affected by heat and infrared radiation from structural members of the blade driving device.

BRIEF DESCRIPTIONS OF THE DRAWINGS

DETAILED DESCRIPTION

In the lens shutter according to an example according the present invention, the focal plane shutter of the other example, and the devices shown in the modified examples, all are provided with a distinctive feature in a structure wherein the variability of the heat that is applied to the various positions on the blade is suppressed, where this distinctive feature is common to all. Note that in the explanations below, the term "shutter device" is used as a general term for a lens shutter and a focal plane shutter.

Embodiments according to the present invention will be explained in detail below, referencing the drawings, following the structures below. However, the embodiment explained below is no more than an example of the present invention, and must not be interpreted as limiting the technical scope of the present invention. Note that in the various drawings, identical reference symbols are assigned to identical structural elements, and explanations thereof may be omitted.

1. Example 1
2. Example 2
3. Modified Examples
4. Distinctive Features of Invention
5. Supplementary Items

1. Example 1

In the lens shutter of this embodiment according to the present invention, a cover is provided for covering the base plate and the driving mechanism, where this cover has a distinctive feature in the point that the distribution of heat in the lens shutter as a whole, including the blade, is caused to be essentially uniform through the cover conducting the heat uniformly. The lens shutter according the present embodiment will be explained below, in reference to the drawings.

Figure 1:
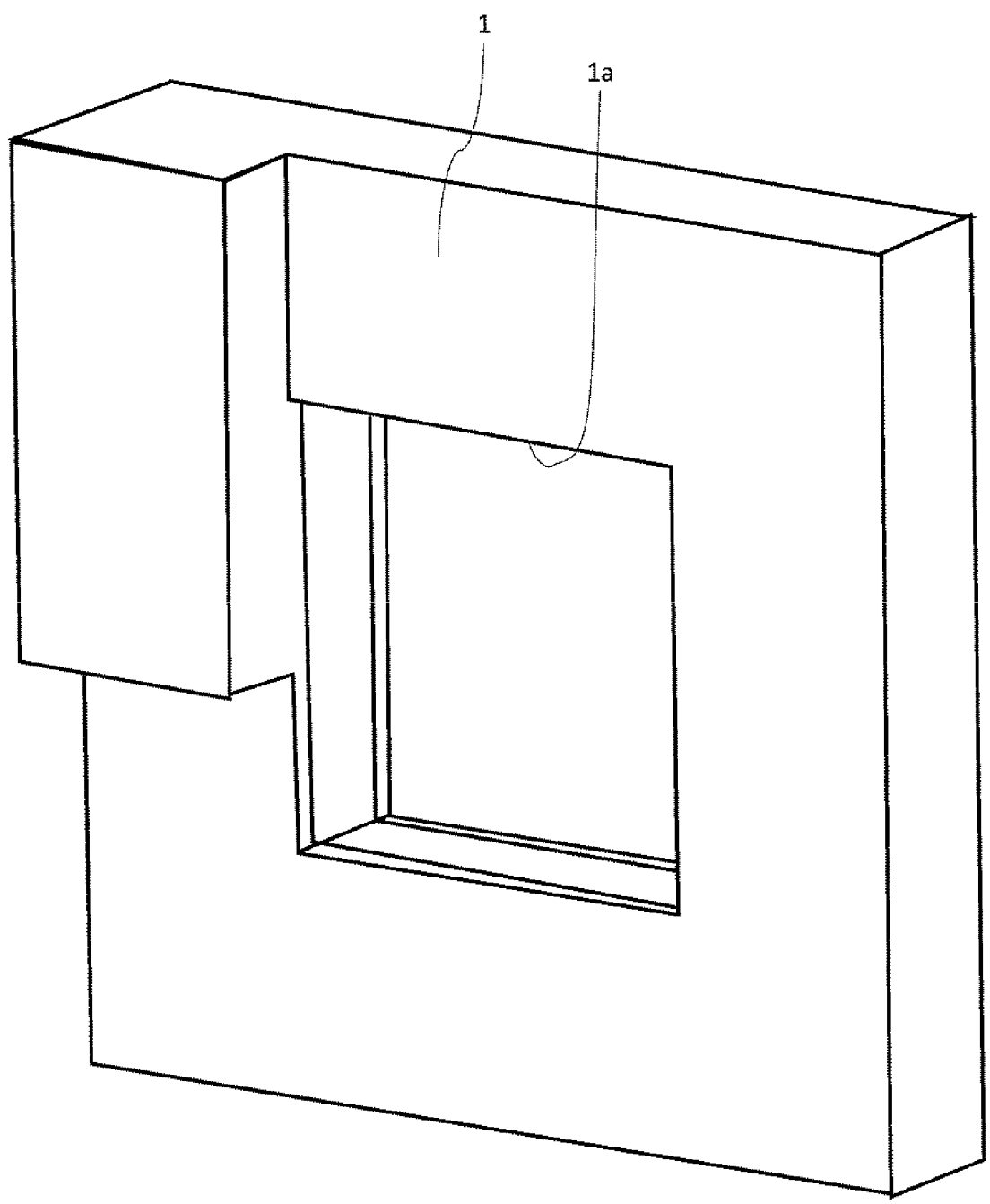
FIG. 1 is an external view of the lens shutter of an embodiment.
Figure 2:
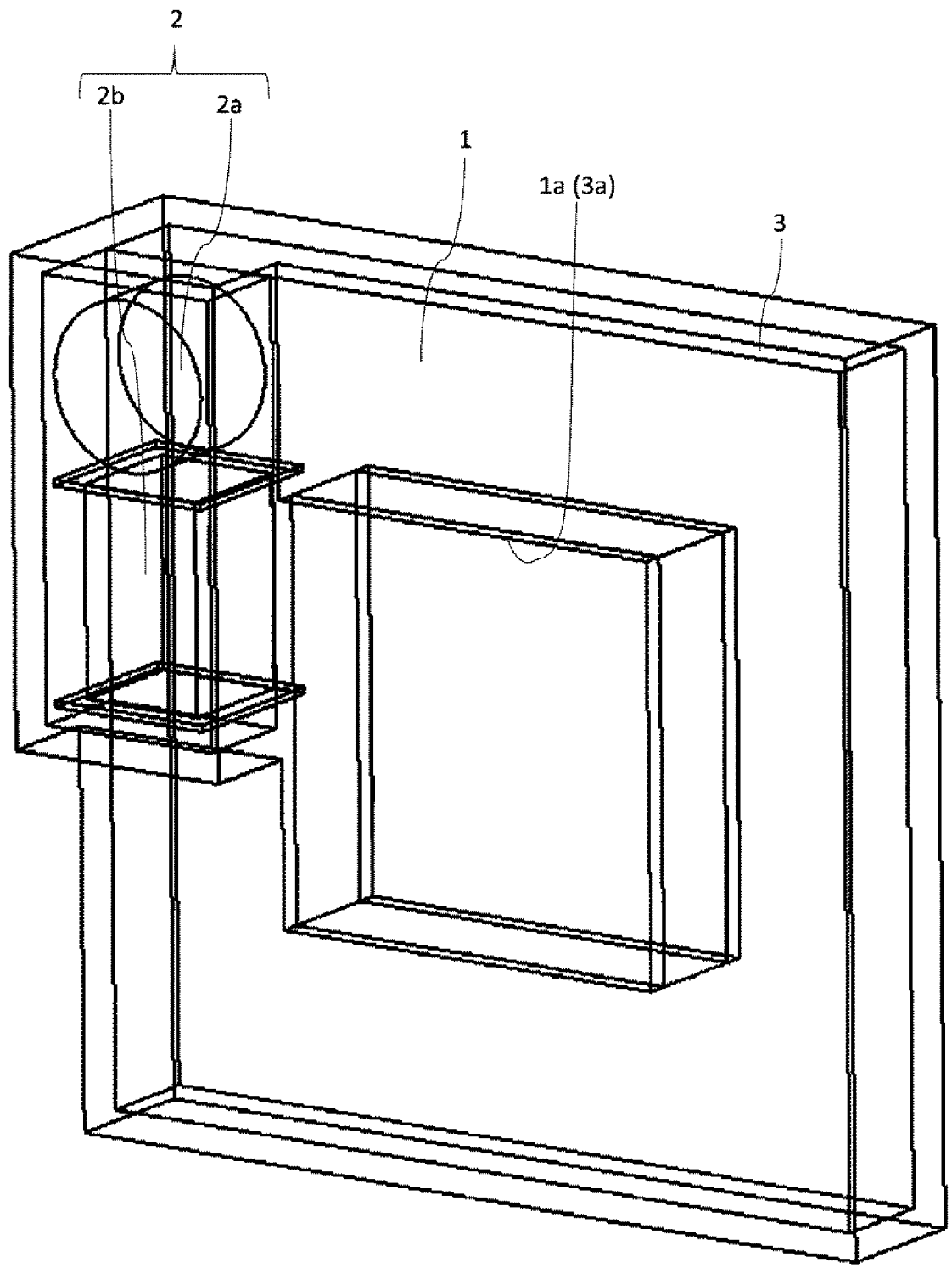
FIG. 2 is a transparent view of a lens shutter of the embodiment.

FIG. 1 and FIG. 2 are perspective diagrams depicting the overall configuration of the lens shutter according to the present embodiment, where FIG. 1 is an external view and FIG. 2 is a transparent view. In the transparent view of FIG. 2, the overall structure is shown by the solid lines.

As shown in FIG. 1 and FIG. 2, the lens shutter according to the present embodiment is structured including a base plate 3, a driving mechanism portion 2, and a cover 1. Moreover, in the lens shutter according to the present embodiment, a supplementary base plate (not shown) is disposed at a position facing the base plate 3, where the same opening portions as in the base plate 3 are formed also in the supplementary base plate. A blade chamber is formed between the base plate 3 and the supplementary base plate, and one blade or a plurality of blades (a blade group) is disposed so as to be contained within this blade chamber.
<Base Plate 3>

The base plate 3 is a substrate part for the lens shutter, and, in the plan view, a rectangular opening portion 3a is formed on the inside thereof. Moreover, a motor 2a and a coil 2b, which structure the driving mechanism portion 2, are disposed at a part of the base plate 3 that does not overlap the opening portion 3a.
<Driving Mechanism Portion 2>

The driving mechanism portion 2 is structured including a rotor (motor) 2a and a coil 2b, as described above, where, when power is applied to the coil 2b through electric power that is supplied from the outside, the rotor 2a rotates, and the driving force is transmitted to the blade through a driving pin (not shown). The driving mechanism portion 2, due to the provision with the rotor 2a, and the like, that is operated through supply of electric power from the outside to the coil 2b in this way, is heated by the heat that is produced by these members. In the driving mechanism portion 2, this heat is emitted to the outside, where this heat is absorbed primarily by the cover 1. Note that because the specific structures and operations of the driving mechanism portion 2 in the present embodiment are the same as those that are conventional, explanations thereof will be omitted here.
<Cover 1>

The cover 1 is formed so as to cover the entirety of the lens shutter, including the base plate 3 and the driving mechanism portion 2, as described above, where a rectangular opening portion 3a, which is similar to that of the base plate 3, is formed. The cover 1 is formed so as to cover the parts that operate the blade, but is formed integrally so as to extend to cover essentially the entirety at the other parts. Moreover, the cover 1 is formed from aluminum, or the like, which has higher thermal conductivity and lower thermal emissivity when compared to the base plate 3 and the driving mechanism portion 2. Because of this, while the cover 1 absorbs the heat from the other structures in the lens shutter, such as the base plate 3, the driving mechanism portion 2, and the like, there is little radiation of heat to the other structures. Moreover, the heat that is transmitted to the cover 1 propagates through the entirety of the cover 1, and thus the overall temperature of the cover 1 becomes uniform.

An infrared radiation sensor (infrared radiation imaging portion) that is able to convert into an electrical signal the infrared radiation that is incident is disposed in front of the opening portion of the lens shutter. When the lens shutter driving mechanism portion 2 drives the blade, the opening/closing state of the opening portion 1a (3a) is changed thereby, so that, with prescribed timing, infrared radiation that is radiated from the imaging subject will be detected by the infrared radiation sensor.

Note that heat from the base plate 3, the driving mechanism portion 2, and the cover 1 that structure the lens shutter is radiated to the blade, and the blade is also heated by this heat. Here, if there were variability in the temperature of the blade, the effect of this heat would be noise in the infrared radiation that is incident on the infrared radiation sensor when the blade is operated, which would prevent the image captured by the infrared radiation sensor from appropriately detecting the state of the infrared radiation that is emitted from the imaging subject. However, in the structure according to the present embodiment, the temperature of the cover 1 as a whole is essentially uniform, as described above, making it possible to suppress the production of such noise. Moreover, because the heat of the blade is essentially uniform, this makes it possible to cause the effects on the infrared radiation detected by the infrared radiation sensor to be uniform, which can suppress, for example, the noise that is the result of the heat of the blade. In this case, a prescribed noise process may be carried out on the overall result of the detection by the infrared radiation sensor.

2. Example 2

The focal plane shutter of a second embodiment according to the present invention comprises a cover that covers the base plate again the driving mechanism portion, in the same manner as with the lens shutter of the first embodiment, where the cover has a distinctive feature in the point that the heat distribution in the focal plane shutter as a whole, which includes the blade, is essentially uniform. Comparing the structure in the present embodiment to the structure in the first embodiment, there is a discrepancy in the point that the lens shutter is replaced with a focal plane shutter, but the other distinctive features are identical. The focal plane shutter according the present embodiment will be explained below, in reference to the drawings.

Figure 3:
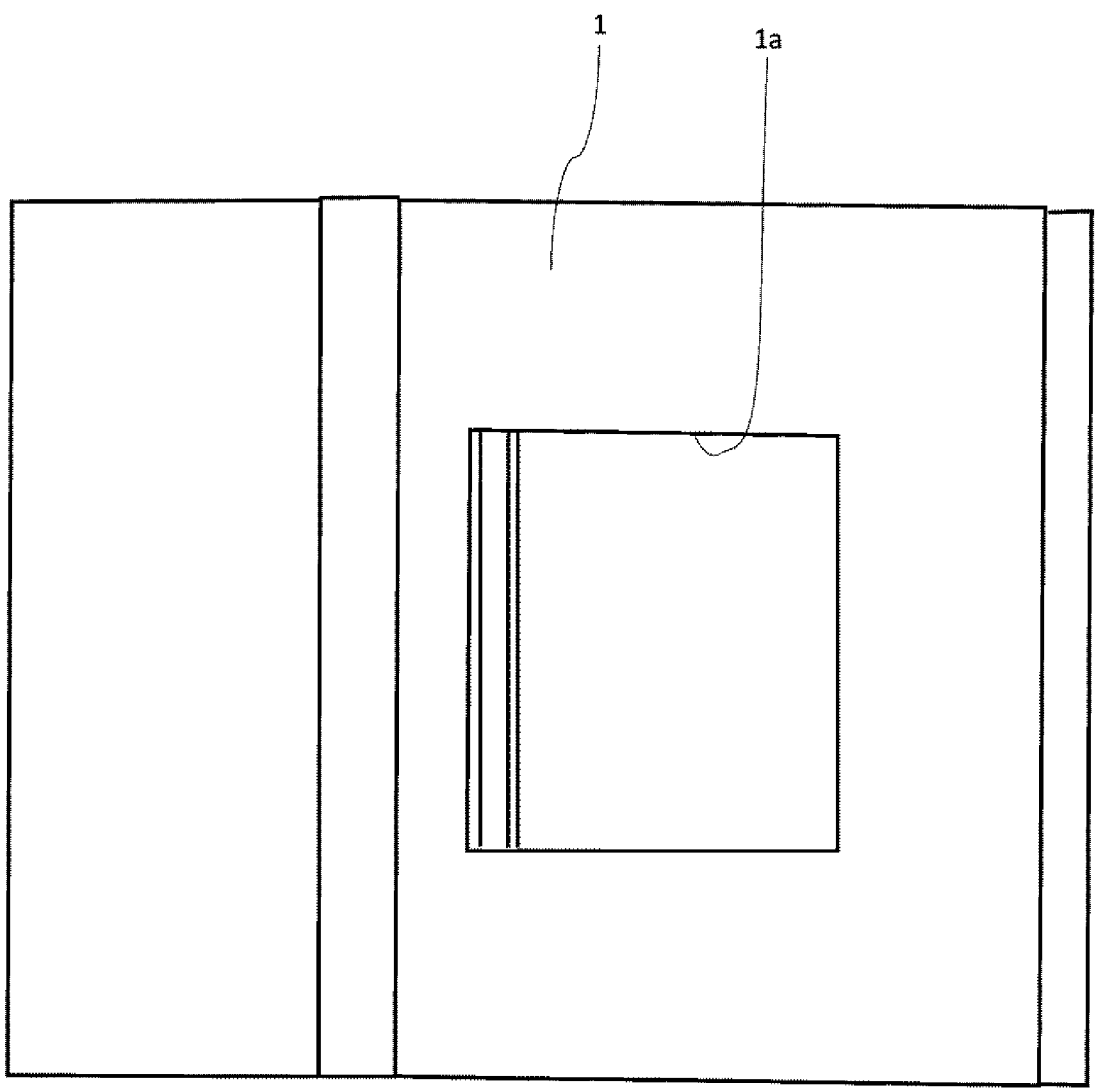
FIG. 3 is an external view of a focal plane shutter of another embodiment.
Figure 4:
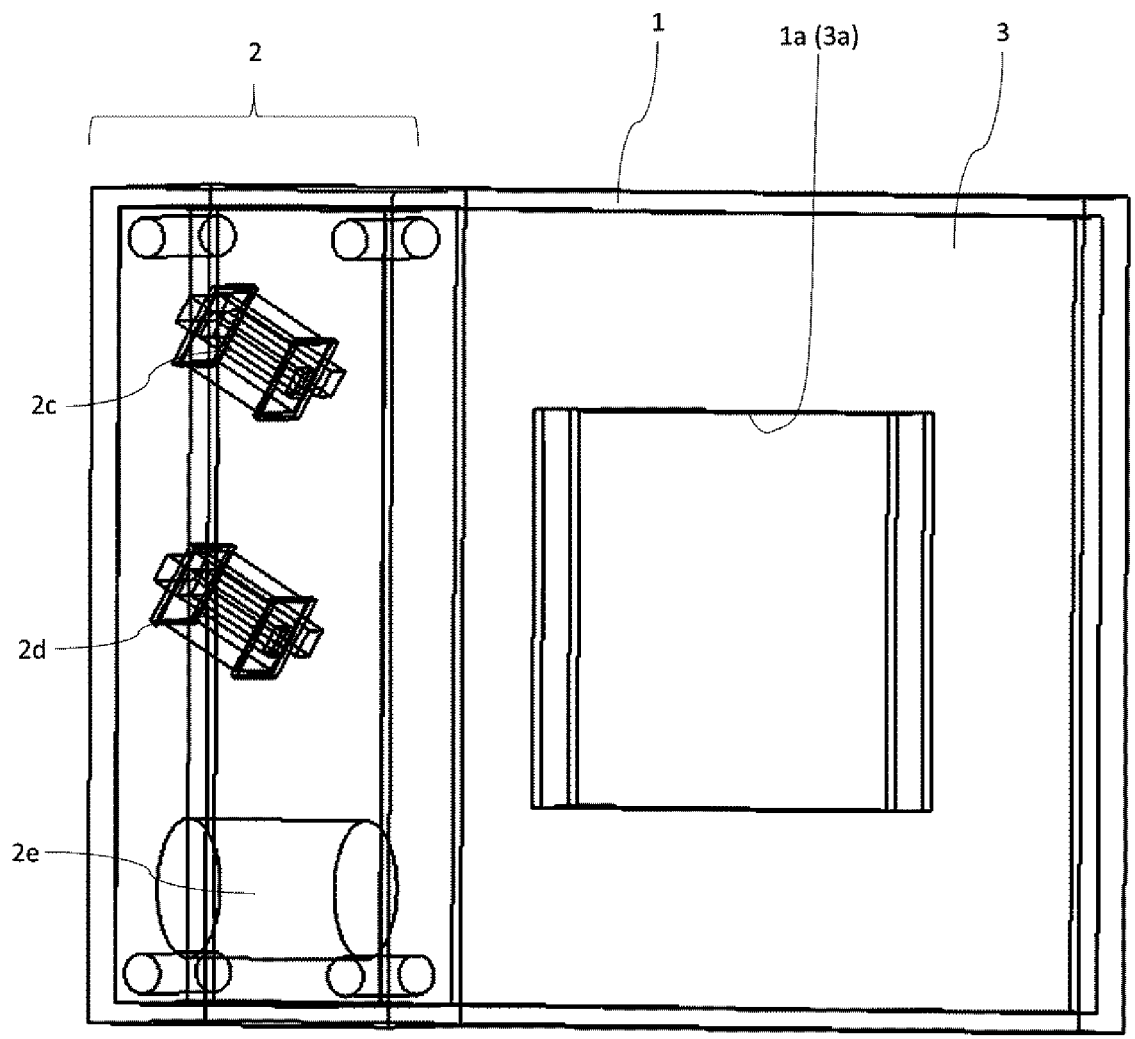
FIG. 4 is a transparent view of a focal plane shutter of the other embodiment.

FIG. 3 and FIG. 4 are perspective diagrams depicting the overall configuration of the focal plane shutter according to the present embodiment, where FIG. 3 is an external view and FIG. 4 is a transparent view. In the transparent view of FIG. 4, the overall structure is shown by the solid lines.

As shown in FIG. 3 and FIG. 4, the lens shutter according to the present embodiment is structured including a base plate 3, a driving mechanism portion 2, and a cover 1. Moreover, in the focal plane shutter according to the present embodiment, a supplementary base plate (not shown) is disposed at a position facing the base plate 3, where the same opening portions as in the base plate 3 are formed also in the supplementary base plate. A blade chamber is formed between the base plate 3 and the supplementary base plate, and one blade or a plurality of blades (a blade group) is disposed so as to be contained within this blade chamber.

<Base Plate 3>

The base plate 3 is a substrate part for the focal plane shutter, and, in the plan view, a rectangular opening portion 3a is formed on the inside thereof. Moreover, a coils (electromagnets) 2c and 2d, and a motor 2e, which structure the driving mechanism portion 2, are disposed at a part of the base plate 3 that does not overlap the opening portion 3a.

<Driving Mechanism Portion 2>

The driving mechanism portion 2 is structured including a electromagnets 2c and 2d, and a charger motor 2e, and the like, as described above, where, through causing the motor 2e and the electromagnets 2c and 2d to operate, through electric power supplied from the outside, driving force is transmitted to the blade through an arm (not shown). The driving mechanism portion 2 is heated by the heat that is produced from the various members, because it is equipped with electromagnets 2c and 2d and the motor 2e, which are supplied electric power from the outside in this way. In the driving mechanism portion 2, this heat is emitted to the outside, where this heat is absorbed primarily by the cover 1. Note that because the specific structures and operations of the driving mechanism portion 2 in the present embodiment are the same as those that are conventional, explanations thereof will be omitted here.

<Cover 1>

The cover 1 is formed so as to cover the entirety of the focal plane shutter, including the base plate 3 and the driving mechanism portion 2, as described above, where a rectangular opening portion 3a, which is similar to that of the base plate 3, is formed.

An infrared radiation sensor (infrared radiation imaging portion) that is able to convert into an electrical signal the infrared radiation that is incident is disposed in front of the opening portion of the focal plane shutter. When the focal plane shutter driving mechanism portion 2 drives the blade, the opening/closing state of the opening portion 1a (3a) is changed thereby, so that, with prescribed timing, infrared radiation that is radiated from the imaging subject will be detected by the infrared radiation sensor.

The focal plane shutter according to the present embodiment, which has a structure that is similar to that in the first embodiment, the temperature of the cover 1 as a whole, in the same manner as in the first embodiment, is essentially uniform, thus enabling suppression of the production of noise in the state of the imaging subject that has been detected through the infrared radiation sensor.

3. Modified Examples

In the first embodiment and the second embodiment, described above, the entire shutter is covered by the cover, causing the heat that propagates to the blade to be as uniform as possible, to suppress the noise in the state of the infrared radiation that is radiated from the imaging subject, detected by the infrared radiation sensor. In the present embodiment, the distinctive feature is that, instead of this structure, a cover is provided that is configured to cover only the driving mechanism portion, where heat from the driving mechanism portion does not propagate to other structural members.

That is, the lens shutter or focal plane shutter of the present embodiment comprises a cover configured so as to cover the vicinity of the driving mechanism portion 2, so that heat will not propagate to the base plate 3 or the blade. This cover, when compared to the cover 1 in the first embodiment and the second embodiment, has even lower thermal emissivity, or in other words, has higher thermal insulation performance.

4. Distinctive Features of Invention

In the lens shutter of the first embodiment and the focal plane shutter of the second embodiment, described above, in a blade driving device comprising a base plate 3, a blade (not shown), a driving mechanism portion 2, and a cover 1, the base plate 3 and the driving mechanism portion 2 are covered by the cover 1, so that, when compared to the conventional configuration, heat in relation to the driving mechanism portion 2 and the base plate 3 can be transmitted without variability. Through this, it is possible to suppress variability even regarding heat that is transmitted to the blade. Consequently, this enables suppression of the effects from the driving mechanism portion 2 and the base plate 3, in respect to the heat and infrared radiation transmitted to the sensor (including the infrared radiation sensor) that is disposed in front of the blade driving device described above.

Moreover, because, in the blade driving device described above, the cover 1 has greater thermal conductivity than the base plate 3, the heat that is emitted from the driving mechanism portion 2 and the base plate 3 can be transmitted as uniformly as possible throughout the entirety of the cover 1. This enables suppression of variability in the heat that is transmitted to the blade from the driving mechanism portion 2, the base plate 3, and the cover 1. Consequently, this enables further suppression of the effects from the driving mechanism portion 2, the base plate 3, and the cover 1 on the heat and infrared radiation that is transmitted to the sensor (including the infrared radiation sensor).

Moreover, in the blade driving device set forth above, the cover 1 has thermal emissivity that is lower than that of the base plate 3, thus making it possible to cause the heat of the cover 1 to be as uniform as possible, by conducting, to the entire range of the cover 1, the transmitted heat, without emitting this heat to other members. This enables further suppression of variability in the heat that is transmitted to the blade. Consequently, this enables further suppression of the effects from the driving mechanism portion 2, the base plate 3, and the cover 1 on the heat and infrared radiation that is transmitted to the sensor (including the infrared radiation sensor).

On the other hand, in the blade driving device set forth in the modified example, the structure comprises a cover that covers the driving mechanism portion 2, and thus has a structure that suppresses the application of heat to the blade. Given this, in the blade driving device of the modified example, it is thus possible to suppress the effects, from the driving mechanism portion 2, the base plate 3, and the cover 1, on the heat and infrared radiation that is transmitted to the sensor (including the infrared radiation sensor).

5. Supplementary Items

An embodiment according to the present invention was explained in detail above. The explanation above is no more than an explanation of one form of embodiment, and the scope of the present invention is not limited to this form of embodiment, but rather is interpreted broadly, in a scope that can be understood by one skilled in the art.

While, in the embodiments set forth above, the explanation raised specific examples envisioning a lens shutter or a focal plane shutter used in an infrared radiation camera, the blade driving device of the embodiments described above may be applied also to other structures. For example, it may be applied as a driving device for an iris blade instead of a driving device for a shutter blade.

Moreover, not just infrared radiation imaging elements that convert infrared radiation into electric signals, but also infrared radiation imaging portions that can capture infrared radiation as images, are included in the meaning of the "infrared radiation sensor" in the present invention.

While the embodiments described above used typical shutter devices as examples and explanations were for only distinctive feature portions, the shutter device may, of course, be provided with typical structures that are provided in shutter devices, such as conventional lens shutters or focal plane shutters, or the like.

Moreover, while in the embodiments described above each of the opening portions were formed as rectangles (rectangular shapes), the opening portions may be of other shapes instead, such as circles or ellipses, and may be designed arbitrarily, depending on the conditions.

The present invention may be used effectively as an infrared radiation imaging device for infrared radiation cameras, thermography, vehicle-mounted night vision cameras, and the like, and as a blade driving device used in any of these infrared radiation imaging devices.

The invention claimed is:

1. A blade driving device comprising:
   a base plate wherein a first opening portion is formed;
   a blade that is formed so as to enable movement so as to open/close the first opening portion;
   a driving mechanism driving the blade; and
   a cover wherein a second opening portion is formed so as to essentially overlap the first opening portion, and formed so as to cover the base plate and the driving mechanism.

2. The blade driving device as set forth in claim 1, wherein:
   the cover has thermal conductivity that is higher than that of the base plate.

3. The blade driving device as set forth in claim 1, wherein:
   the cover has thermal emissivity that is less than that of the base plate.

4. The blade driving device as set forth in claim 1, wherein:
   the driving mechanism includes at least a rotor and a coil.

5. The blade driving device as set forth in claim 1, wherein:
   the driving mechanism portion includes at least an electromagnetic and a charging motor.

6. An infrared imaging device comprising:
   a blade driving device as set forth in claim 1; and
   an infrared radiation imaging portion disposed so as to detect light that passes through the first opening portion and the second opening portion.

\* \* \* \* \*